Sept. 20, 1932.   F. H. ADAMS   1,878,656
HOBBING MACHINE
Filed Sept. 23, 1929   4 Sheets-Sheet 4
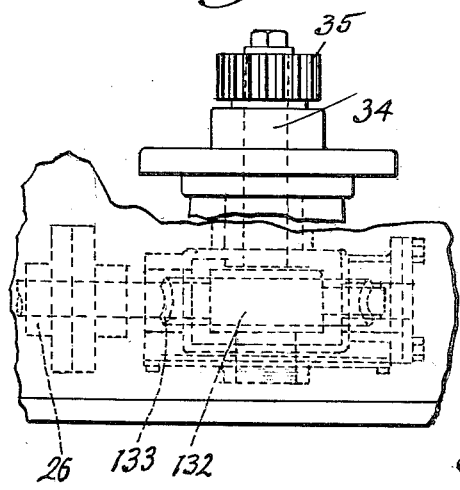
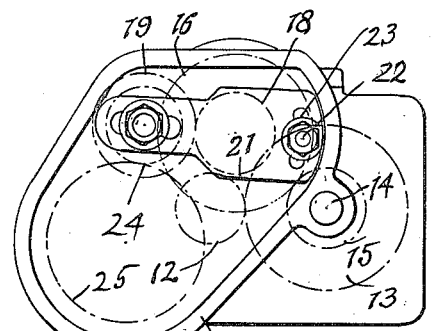
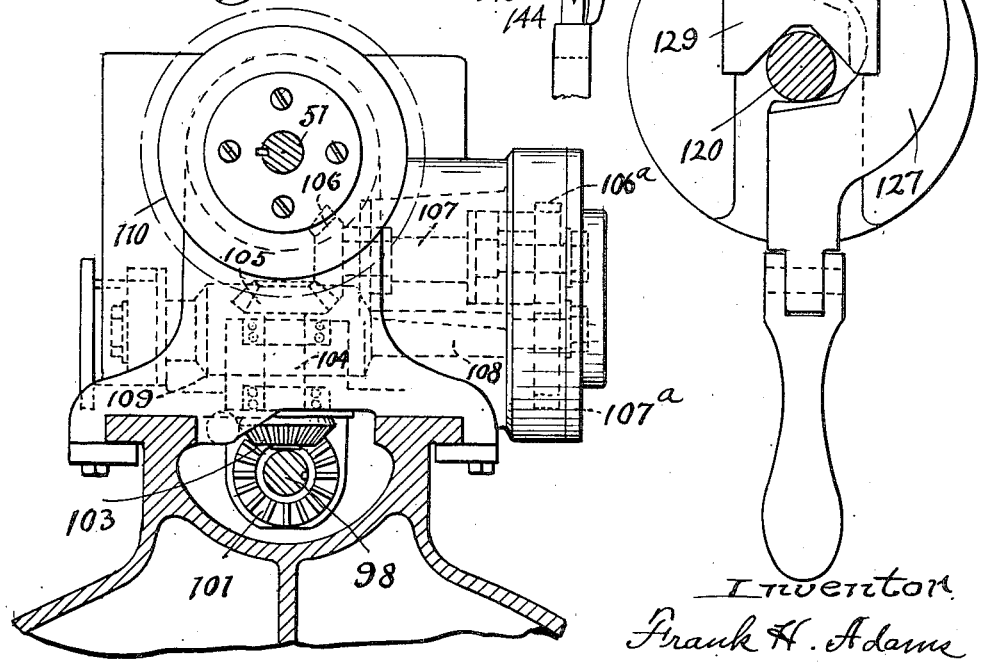

Patented Sept. 20, 1932

1,878,656

UNITED STATES PATENT OFFICE

FRANK H. ADAMS, OF CLEVELAND HEIGHTS, OHIO, ASSIGNOR TO THE CLEVELAND HOBBING MACHINE COMPANY, OF CLEVELAND, OHIO, A CORPORATION OF OHIO

HOBBING MACHINE

Application filed September 23, 1929. Serial No. 394,424.

The present invention relates to a machine tool and is herein illustrated as embodied in a multiple cutter machine in which a series of milling machines are mounted to travel in an endless path, moving past an operator's station where finished articles are removed and blanks to be milled are inserted, the individual machines being so operated and controlled during their travel in said endless path that the operation on each blank is completed during the travel of the machine from and to the operator's station. It should be understood however that in so far as certain of its aspects are concerned, the invention is capable of embodiment in a single cutter machine and that there is no intention to limit the invention in all of its phases to a multiple cutter machine.

The invention is described as applied to a multiple spindle hobbing machine with which it has special utility, such machine comprising a series of separate hobbing units carried by a rotary turret mounted upon a fixed base and being an improvement on the machine shown in the co-pending application of Luther A. Sommer and Frank H. Adams, Serial No. 61,871, filed October 12, 1925.

The present invention has for an object the provision in a machine tool of means for causing the work blank to move laterally with respect to the tool during the relative feeding movement between the tool and blank.

Another object is to increase the range of utility of the machine so that it may be used to hob either cylindrical or tapered portions of blanks by simply making slight adjustments of the relationship of certain operative parts thereof.

Another object is to provide a machine tool capable of forming in a tapered portion of a blank spline grooves of constant depth.

A further object is to provide a machine tool wherein the operation of the different elements thereof is readily controlled and wherein the operating parts function with a minimum of vibration or chatter.

Additional objects and advantages of the invention will become apparent hereinafter.

The following description and accompanying drawings set forth in detail certain means embodying the invention, the disclosed means however constituting but one of the various mechanical forms in which the principle of the invention may be employed.

Reference should be had to the accompanying drawings forming a part of this specification in which, Figure 1 is an axial section from the center of the outer circumference of the machine, the section being taken centrally through one of the hobbing units;

Fig. 6 is a detail view showing the driving connection between the driven shaft and the turret;

Fig. 7 is a side elevation of the reduction gear casing shown in Fig. 5;

Fig. 8 is a detail view;

Fig. 9 is a sectional view taken on line 9—9 of Fig. 2, looking in the direction of the arrows; and Fig. 10 is a sectional view taken on line 10—10 of Fig. 1.

Figure 1:
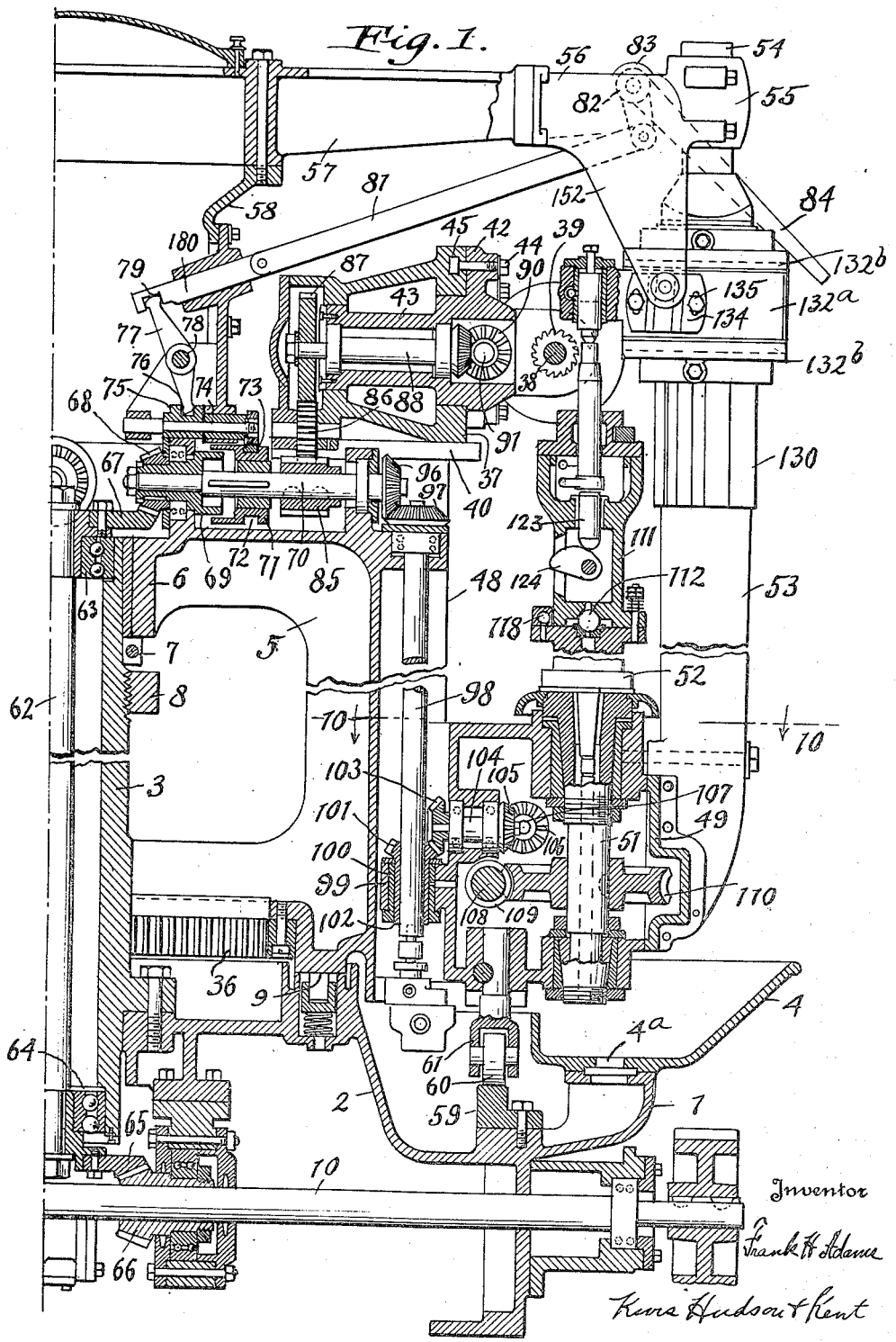
Figure 2:
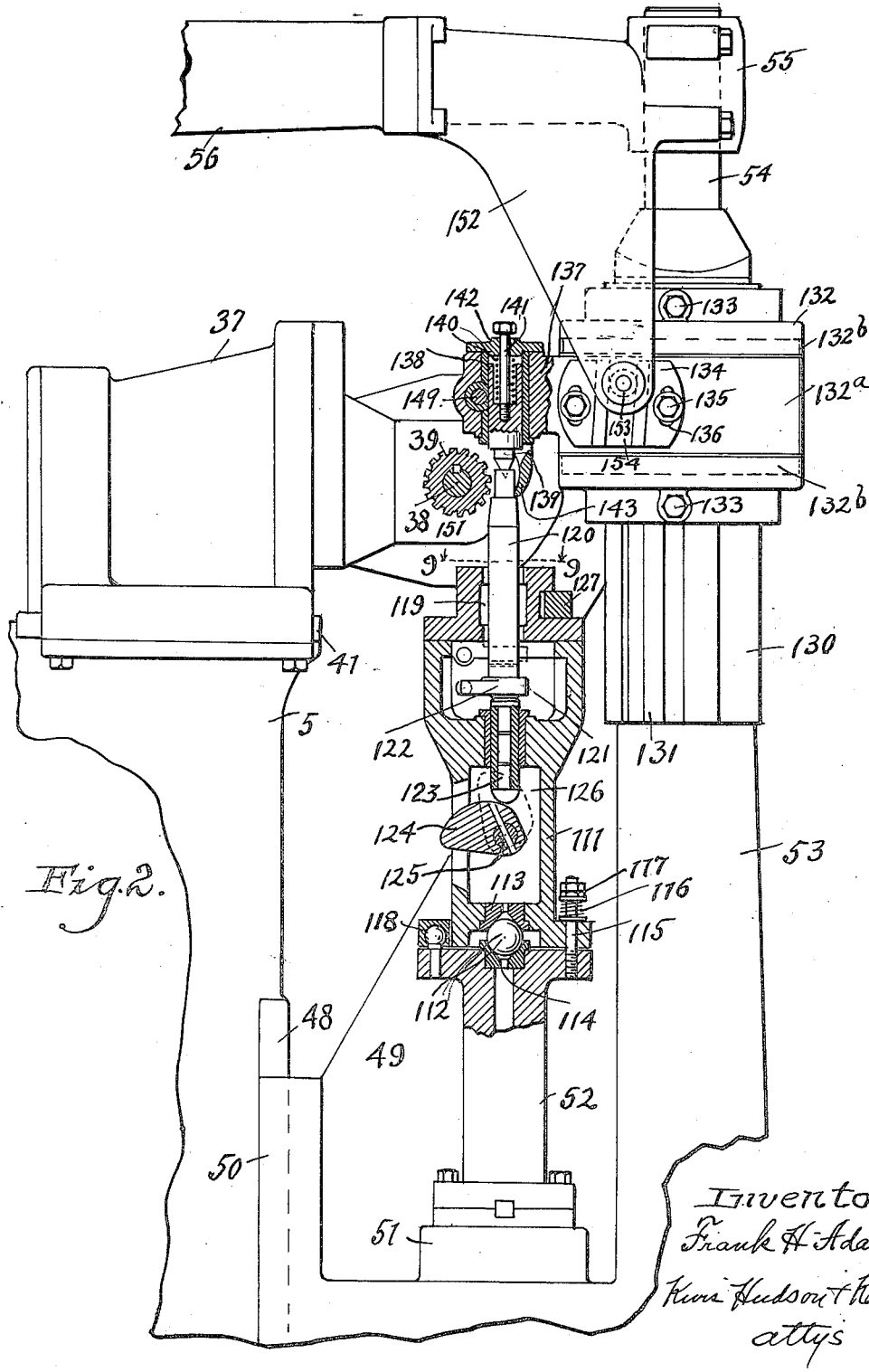
Fig. 2 is a fragmentary elevational view of the machine showing one of the hobbing units, portions of such unit being shown in section.
Figure 3:
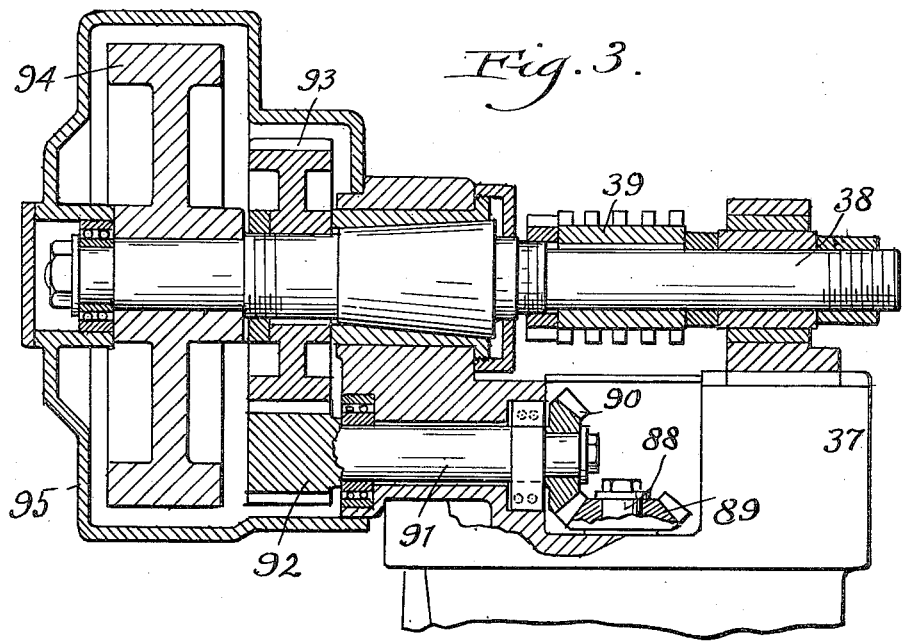
Fig. 3 is a fragmentary top plan view partly in section showing a portion of the gearing for driving the hob.
Figure 4:
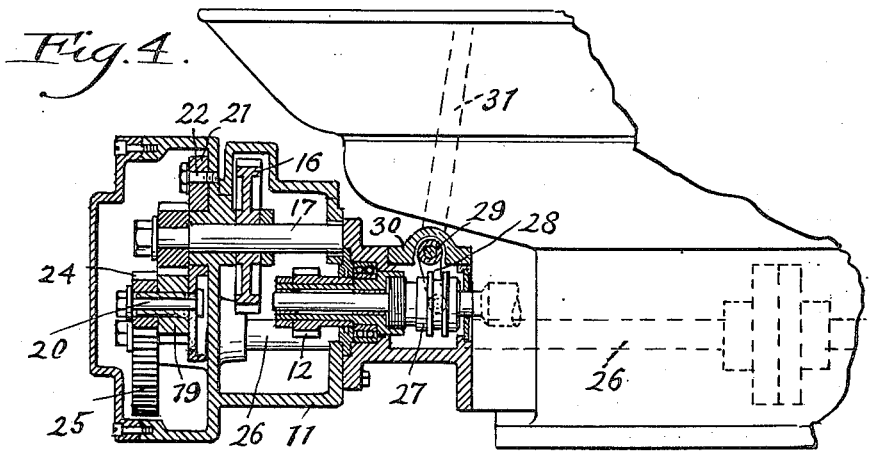
Fig. 4 is a fragmentary front elevation, showing in section the reduction gear train and casing at one side of the base.
Figure 5:
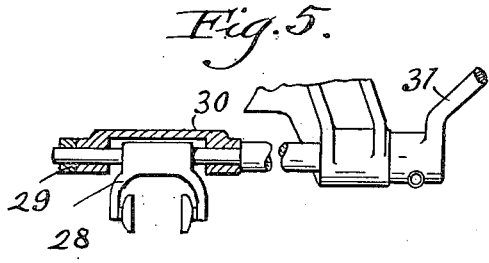
Fig. 5 is a detail view.

In the accompanying drawings the invention is shown applied to a multiple spindle hobbing machine, the entire mechanism being mounted upon a fixed circular base 1 which has a solid bottom forming a drip pan 2 to catch any lubricant dripping from the cutter. Rigidly secured to the base 1 at the center thereof is a vertical hollow column 3 and at the periphery of the base there is mounted an annular drip trough 4 which has openings 4a in the bottom thereof to permit lubricant to drain down into the pan 2.

A rotary turret 5 is mounted upon the column 3 and has a central bearing sleeve 6 which fits upon the top of the post and is supported by thrust bearing 7 which is adjustably supported on the column 3 by an adjusting nut 8.

Outwardly from the central column 3 the turret 5 slides upon a lubricating bearing 9 carried by the base 1. The drive shaft 10, driven from any suitable source of power, extends through the base 1 and into a gear case 11 at one side of the base. Within the gear case 11 there is a speed reducing gear train consisting of a gear 12 on the shaft 10 which meshes with a gear 13 on a countershaft 14 arranged in the casing, such countershaft having fixed thereto a gear 15 which meshes with a large gear 16 arranged on a second countershaft 17, such second shaft having a small gear 18 fixed thereto. The gear 18 meshes with a gear 19 fixed on shaft 20 which is carried by a bracket 21 adjustably supported by the gear casing by means of a bolt 22 extending through a slot 23 in the bracket and anchored at its end in the casing. A second gear 24 is fixed to the shaft 20 and meshes with a large gear 25 on a shaft 26 which extends into the base parallel with the shaft 10.

Inwardly of the gear 12 the shaft 10 is provided with a clutch 27, such clutch being actuated to engaged or disengaged position by means of a shifting yoke 28 fixed on a shaft 29 arranged horizontally in a clutch housing 30 and rotated by means of an actuating lever 31 secured to its end. The shaft 26 is driven at a lower rate of speed than the main driving shaft 10 and operates gearing for rotating the turret 5. This gearing includes a worm 32 arranged on the shaft 26 and meshing with a worm 33 on a vertical shaft 34, this last shaft carrying a pinion 35 at its upper end meshing with a large internal gear 36 fixed to the turret.

Upon the upper portion of the turret a series of regularly spaced radially adjustable cutter heads 37 are mounted (only one such head being shown since the construction of the heads is identical), each head having mounted therein a transversely disposed angularly adjustable cutter spindle 38 to which is attached a hobbing cutter 39. Each head 37 is slidably mounted on a radially disposed guideway 40 on the turret and may be adjusted inwardly or outwardly along the guideway by means of a lead screw 41. Each cutter spindle 38 is mounted in an auxiliary head 42 which has a tubular extension 43 extending radially into the head 37 and angularly or rotatably adjustable therein, the auxiliary head 42 being held in adjusted position by bolt 44 extending through the head 42 and having its head within an arcuate groove 45 in the head 37.

The body of the turret 5 is provided with a pair of vertical guide ribs 48 beneath each cutter head 37, and upon each pair of guide ribs 48 there is slidably mounted a vertically movable work holding head 49. For retaining the work holding head 49 upon the guide ribs each rib has a lateral extension along its outer edge, while the heads are provided with extensions 50 which overlie the edges of the oppositely extending extensions of the ribs, the head of course being held in place by gibs secured to the extensions 50 of the head and overlying the extensions of the guide ribs 48.

Each work holding head 49 has a vertical spindle 51 journalled in suitable bearings in the upper and lower portions thereof and has rigidly connected to its upper end an extension 52. Each head 49 also has a vertical arm 53 rigidly secured to the outer side thereof and extending upwardly therefrom. Each arm 53 is provided at its upper end with a cylindrical extension 54 which extension slides in a guide sleeve 55 on the outer end of a radial arm 56 carried by the turret 5. The radial arms 56 carrying the guide sleeves 55 are in this construction secured to and form continuations of the radial arms of a spider 57 secured to the top of an upright hollow casting 58 in turn secured to the top of the turret 5. This forms a top or overhead support for the upstanding work supporting arms 53 and steadies them so as to minimize chatter during the cutting operation. In effect, the arms 56, spider 57 and casting 58 form a part of the turret 5.

The vertically movable work heads 49 are supported upon an annular cam track 59 carried by the base 1, each head 49 being supported by roller 60 which travels along the track 59 and is carried by a vertical forked post 61 which is rigidly mounted on the bottom of the head. The cam track 59 is provided with a depressed portion, while inclined shoulder portions are arranged at the opposite ends thereof leading to an elevated portion of the track, such elevated portion extending throughout the major portion of the circumference of the track and being inclined uniformly from the shorter inclined shoulder to the higher inclined shoulder as clearly set forth in the copending application hereinabove mentioned. It will thus be seen that provision is made for lowering the work holder sufficiently while passing along the depressed portion of the track to free the blank from the cutter and to permit the finished blank to be removed and a new blank inserted. Of course, as the roller 60 supporting each work holding head moves up the shorter inclined shoulder the blank is brought into engagement with the cutter and as the work head travels along the gradually inclined portion of the track the blank is fed to the cutter.

Both the cutter and work spindles are driven from the drive shaft 10 through gearing mounted upon the turret, the drive being effected through a vertical shaft 62 journalled in upper and lower bearings 63 and 64 within the central hollow column 3 and at the axis of the turret. The shaft 62 has a bevel gear 65 at the lower end thereof which meshes with a bevel gear 66 fixed to the shaft 10, while at the upper end thereof the shaft 62 has fixed thereto a large bevel gear 67 which meshes with a series of bevel gears 68 which are carried by sleeves 69 rotatably mounted on radial shafts 70, there being one radial shaft 70 for each of the hobbing units. The outer end of the sleeve 69 is formed to provide a clutch element which cooperates with a slidable clutch element 71 keyed to the shaft 70. The slidable clutch element 71 on each of the radial shafts 70 is provided with a circumferential groove 72 which receives a downwardly extending projection 73 carried by a radially disposed horizontal pin 74 which is slidably mounted in the wall of the turret above the shaft 70. The pin 74 has attached thereto a collar 75 provided on its upper side with a transverse groove 76 which receives the lower end of a lever 77 mounted on the turret above the pin 74 to swing about a horizontal pivot 78. The upper end of the lever 77 extends into a transverse slot 79 in the inner end of a sliding pin 80 which is inclined in an upwardly direction and is slidably mounted in the wall of the turret. To the outer end of a pin 80 there is connected a link 81 which in turn is connected at its outer end to a crank arm 82 fixed to a shaft 83 journalled in the arm 56 upon the inner side of the guide sleeve 55. Rigidly attached to the shaft 83 is a lever 84 which projects outwardly past the arm 53 and is adapted to be operated to shift the clutch element 71 into or out of engagement with the sleeve 69 so that each of the radial shafts 70 may be driven or may be freed from the driving shaft each individually or independently of the others. Both the rotary cutter and the rotating work spindle of each unit are driven from a radial shaft 70 and any one of the hobbing machines or units can be stopped at any time by operating the corresponding lever 84 to disengage the clutch element on the sleeve 69 and the clutch element 71.

For driving the cutters, each shaft 70 has an elongated spur gear 85 fixed thereto which is in sliding mesh with an idler 86 carried by the radially adjustable head 37 and in turn meshing with a gear 87 on a second radial shaft 88 above the radial shaft 70, the shaft 88 being journalled within the tubular sleeve 43 forming the radial pivot of the auxiliary outer head 42. At its outer end each shaft 88 has a bevel gear 89 which meshes with a bevel gear 90 on a horizontally disposed shaft 91 at right angles to the shaft 88 and carried by the auxiliary cutter head 42 which is angularly adjustable about the shaft 88. The shaft 91 has either fixed thereto or integral therewith at its end opposite to the end carrying the gear 90 a gear 92 which meshes with a gear 93 on the cutter spindle 38.

In order to reduce vibration and chatter in the operation of the machine, the cutter spindle 38 is provided at its end, outwardly of the gear 93, with a flywheel 94. Although not specifically mentioned, it should be understood that the shafts referred to are journalled in suitable bearings, while the gears 92 and 93 and the flywheel 94 are enclosed in a suitable housing 95.

At the outer end of each radial shaft 70 there is a bevel gear 96 which meshes with a bevel gear 97 fixed to the upper end of a vertical shaft 98 journalled in the outer portion of the turret body and positioned in the channel between the vertical guide flanges 48 of the turret. Each work head 49 has a guide arm 99 extending into the channel between the ribs 48 upon which the head slides, and this guide arm has a vertical opening therethrough in which is mounted a bearing sleeve 100 surrounding the shaft 98. Slidably keyed on the shaft 98 is a bevel gear 101 which has an integral sleeve 102 journalled in the bearing sleeve 100. The gear 101 is thus mounted to move vertically with the head 49 and meshes with a bevel gear 103 fixed to the inner end of a short shaft 104 journalled in the inner wall of the head 49. The shaft 104 has a bevel gear 105 at the outer end thereof which meshes with a bevel gear 106 on a countershaft 107 extending at right angles to the shaft 104.

The countershaft 107 has fixed thereto at its end opposite to that carrying the gear 106 a gear 106a which meshes with a gear 107a on a shaft 108 extending parallel with the shaft 107 and below the same, this shaft 108 carrying a worm 109 which meshes with a worm gear 110 fixed to the work spindle 51.

Carried by the extension 52 of the work spindle 51 is a blank receiving and carrying extension 111. This extension 111 is connected to the extension 52 with a connection somewhat in the nature of a universal connection since a ball 112 is arranged in upper race 113 and lower race 114 carried by the two extensions, while the extensions are held together under spring tension by means of bolts 115 passing through the head on the extension 52 and the extension 111 and having springs 116 arranged thereon between the extension 111 and nuts 117 on the end of the bolts 115. A retaining member 118 carried by the head of the extension 52 also serves to maintain the two extensions in the proper position. It will be seen that by means of this connection the extension 111 will be capable of having angular movement with respect to the extension 52. The extension 111 is provided at its upper end with an axial bore 119 through which may extend the end of a work blank 120 while just below the bore 119 the extension 111 has an enlarged bore 121 within which projecting portions 122 on the lower end of the blank 120 are received. Below the enlarged bore 121 is a smaller bore receiving an adjustment pin 123, the upper end of such pin bearing against the lower end of the blank 120. In order to actuate this pin so as to engage blanks of different lengths a cam 124 is mounted on a horizontal pivot 125 passing through the extension 111, the cam 124 being arranged in a suitable recess 126 formed in the extension and bearing upon the lower end of the pin 123, whereby as the cam is turned the pin will be raised or lowered the desired amount.

At the upper end of the extension 111 an eccentric retaining lever 127 is pivoted at 128 being arranged so that when it is swung to its operative position a portion of the lever 127 will lie in a cut-away portion of the extension 111 and be in engagement with the work blank 120 forcing such blank into contact with a clamping member 129, as clearly shown in Fig. 9.

The arm 53 is provided below the cylindrical extension 54 thereof with a portion 130 having a number of longitudinal guide ribs 131 and also forming a way for a member 132 vertically slidable thereon, such member being held in various positions of adjustment on the portion 130 by means of clamping bolts 133. A slide 132a is mounted in guideways 132b in the member 132 for movement transversely of the post toward and from the cutter. A plate 134 is secured to the slide 132a by bolts 135 passing through arcuate slots 136 in the plate, whereby the plate may be angularly adjusted. The slide 132a has an inwardly extending arm 137, which has a vertically disposed opening therethrough in which is arranged a vertical sleeve or bushing 138. A centering pin 139 is mounted in the sleeve 138, such pin being held downwardly under spring pressure by the spring 140 arranged in a counter-bore in the upper end of the pin and surrounding a bolt 141 which is secured at its lower end to the pin, while its upper headed end extends through a retaining plate 142, the head of the bolt 141 being above such retaining plate.

A pawl 143 is pivoted to the arm 137 upon a horizontal pivot 144 and is normally held in one position by a spring 145 arranged between one end of the pawl and a lug 146 on the arm. Intermediate the pivot 144 and the spring 145 a screw bolt 147 extends through the pawl and bears against a cam lever 148 mounted on a horizontal pivot pin 149 extending through the arm above and to one side of the pivot 144.

When the handle 150 of the cam lever 148 is moved in one direction, the cam bears against the screw bolt 147 and rocks the pawl against the tension of the spring 145 until the lower end of the pawl engages with a shoulder 151 on the work blank serving to properly position the work with respect to the hobbing cutter.

Extending downwardly from the radial arm 56 is an arm 152, such arm having at its lower end a roller 153 engaging in an angularly disposed groove 154 formed in the adjustable plate 134, and causing the slide 132a to move backwardly and forwardly during reciprocation of the work head.

In operating the machine the adjustment which will be given to the plate 134 depends upon the character of the work blank. If for example the machine is to be used for splining cylindrical portions of the shafts or other blanks the plate 134 will be adjusted so that the groove 154 is parallel with the arm 53 whereupon the roller 153 imparts no reciprocating movement to the slide 132a when the work head is reciprocating and the distance between the axis of the work blank and the cutter does not vary. However, when it is desired to spline a tapered portion of a shaft or other blank the plate 134 is adjusted so as to have the groove 154 angularly disposed with respect to the arm 53 the proper amount to cause the roller 153 to reciprocate the slide during the reciprocation of the work head and to thereby move the axis of the work blank toward or from the cutter to compensate for the taper of the blank. The tapered portion of the shaft or other blank will be correctly splined since the axis of the blank during the longitudinal movement thereof while the slide 132a is reciprocated will move laterally with respect to the cutter an amount sufficient to have the grooves formed therein of constant depth. It is also apparent that while the work head is moving vertically in a straight line, the axis of the blank carried thereby will move angularly with respect to the vertical, such deflection of the blank being permitted by the connection between the extension 152 and the extension 111.

Although a specific embodiment of the invention has been disclosed herein it should be understood that the invention is not to be limited thereto except in so far as the scope of the appended claims so limits it.

Having thus described my invention, I claim:

1. In a machine of the character described, a support adapted to be given a feeding movement relative to a tool, a slide slidably carried by said support, a tail stock carried by said slide and adapted to engage with one end of a work blank, and means for moving said slide laterally during said relative feeding movement laterally with respect to the direction of such movement.

2. In a machine of the character described, a support, a work holding head movably mounted adapted to feed the work blank carried thereby past a cutter, a slide slidably supported by said head and having a tail stock adapted to engage with the end of the work blank, and means for moving said slide during movement of said head to tilt the axis of said blank.

3. In a machine of the character described, a support, a work holding head movably mounted on said support adapted to feed the work blank carried thereby past a cutter, a slide slidably supported by said head and adapted to have movement relative thereto in a direction transverse to the direction of movement of said work holding head, a work engaging means carried by said slide and adapted to engage said blank, and cooperating means carried by said slide and said support for causing movement of said slide during movement of said head whereby the distance between the axis of said blank and the cutter will vary during the cutting operation.

4. In a machine of the character described, a support, a work holding head movably mounted on said support adapted to feed a work blank carried thereby past a cutter, a slide associated with said head and capable of having movement with respect thereto transversely of the direction of movement of said head, a tail stock carried by said slide and engaging an end of the blank, adjustable cooperating means carried by said slide and said support for moving said slide variable predetermined amounts during movement of said head, to thereby move said tail stock for shifting the blank and a head stock mounted on a said work holding head adapted for engaging the other end of the blank and permitting its movement.

5. In a machine of the character described, a support, a work holding head mounted for bodily movement on said support adapted to feed the work blank carried thereby to a cutter, a slide carried by said head and capable of moving thereon transversely to the direction of movement of said head, a tail stock carried by said slide for engaging one end of the blank, cooperating means carried by said slide and said support for effecting movement of said slide during movement of said head to thereby move said tail stock for shifting the end of the blank, means for adjusting the relationship between said cooperating means to control the amount of movement of said slide, and a head stock mounted on said work holding head adapted for engaging the other end of the blank and permitting its movement.

6. In a machine of the character described, a support, a work holding head mounted for bodily movement on said support adapted to feed a work blank carried thereby past a cutter, a slide arranged on said head for movement transversely of the direction of movement of said head, a tail stock carried by said slide for engaging one end of the blank, a grooved plate carried by said slide, means for adjusting said plate to arrange said groove at an angle to the axis of the work blank, means carried by said support engaging in said groove and causing said slide to move during movement of said head, and a head stock adapted for engaging the other end of the blank.

7. In a machine of the character described, a support, a head mounted on said support adapted for bodily movement thereon in a direction transverse to the axis of a cutter, means universally connected with said head for supporting one end of a work blank whereby the latter will be fed to the cutter during movement of the head, a tail stock associated with said head for engaging the other end of the blank, and means for moving said tail stock in a direction transversely to the direction of and during the movement of said head.

8. In a machine of the character described, a support, a rotatable spindle carried by said support, a head carried by said support and having bodily movement thereon in a direction transverse to the axis of said spindle, said head being adapted to support a work blank and feed the latter during its bodily movement past a cutter, a vertically adjustable slide slidably carried on said head and capable of movement in a direction transverse to the direction of movement of the head, a tail stock carried by said slide for engaging the end of the work blank adjacent to the cutter, and adjustable cooperating means carried by said slide and said support for causing the slide to move toward and from the axis of the spindle during bodily movement of the head to vary the distance between the spindle and the axis of the work blank.

9. A hobbing machine comprising a base, a turret rotatably supported on said base, means for rotating said turret, a hob head movably supported by said turret, a spindle rotatably supported by said head and adapted to support a hob, means supported by said turret adapted to engage a work piece, means controlled by the rotation of said turret for moving said last mentioned means laterally of said spindle, and means for producing relative movement between said spindle and said means radially of said spindle.

10. A hobbing machine comprising a hobbing unit carried by a rotatable support, a spindle adapted to support a hobbing cutter, a head bodily movable in a direction transverse to the axis of said cutter spindle, a work blank supporting member universally connected with said head, a slide carried by said head and adapted to have movement in a direction transverse to the movement of said head, a tail stock carried by said slide for engaging an end of the work blank, and adjustable cooperating means carried by the slide and the rotating support for causing the slide to move in predetermined amounts and controlled by rotation of said support.

11. A hobbing machine comprising a hobbing unit arranged upon a rotatable support, a spindle adapted to support a hobbing cutter, a head movable in a direction transverse to the axis of said cutter spindle, a work blank engaging member universally connected with said head, a slide mounted on said head and capable of movement in a direction transverse to the direction of movement of the head, a tail stock carried by said slide for engaging the end of the work blank adjacent to the cutter, a grooved plate adjustably associated with said slide, and means carried by said rotatable support engaging the groove in said plate and moving said plate upon rotation of said support.

12. A hobbing machine comprising a base, a turret rotatably supported on said base, means for rotating said turret, guideways on said turret normal to the axis thereof, a hob head slidably supported by said guideways, a hob spindle rotatably supported by said hob head, guideways on said turret parallel with the axis thereof, a slide slidably supported by said last mentioned guideways, a spindle rotatably supported by said slide, means for rotating said spindle, means on said slide adapted to engage a work blank, a single cam supported by said base for moving said last mentioned means upon said guideways as the turret is rotated, and means actuated by the rotation of said turret for providing relative movement between said hob spindle and said last mentioned means radially of said hob spindle.

13. A hobbing machine comprising a base, a turret rotatably supported on said base, means for rotating said turret, a hobbing unit mounted on said turret, said hobbing unit comprising means adapted to support a rotatable cutter, means adapted to engage a work piece, means controlled by the rotation of said turret adapted to produce relative movement between said cutter support and said work engaging means, and means controlled by the rotation of said turret adapted to produce relative movement between said cutter support and said work engaging means in a direction transverse to the first mentioned movement.

14. A hobbing machine comprising a base, a turret rotatably supported on said base, means for rotating said turret, a hobbing unit mounted on said turret, said hobbing unit comprising means adapted to support a rotatable cutter, means adapted to engage a work piece, means actuated by the rotation of said turret adapted to produce relative movement between said cutter support and said work engaging means, and means actuated by the rotation of said turret adapted to produce relative movement between said cutter support and said work engaging means in a direction transverse to the first mentioned movement.

15. A hobbing machine comprising a base, a turret rotatably supported on said base, means for rotating said turret, a hobbing unit mounted on said turret, said hobbing unit comprising means adapted to rotatably support a cutter, means adapted to engage a work piece, cam means actuated by the rotation of said turret adapted to produce relative movement between said cutter support and said work engaging means, and means actuated by the rotation of said turret for producing relative movement between said cutter support and said work engaging means in a direction transverse to the first mentioned relative movement.

16. A multiple hobbing machine comprising a base, a turret rotatably supported on said base, means for rotating said turret, a hobbing unit supported on said turret, said hobbing unit including a rotatable cutter holder and a rotatable work holder, means for rotating said holders, means for producing relative feed movement between the cutter and work, and means controlled by the rotation of said turret for varying the distance between the axis of the cutter and work.

In testimony whereof, I hereunto affix my signature.

FRANK H. ADAMS.